United States Patent Office 3,652,688
Patented Mar. 28, 1972

3,652,688
HALOGENATION OF UNSATURATED HYDROCARBONS
Jerome Robert Olechowski, Trenton, and Ralph Levine, Freehold, N.J., assignors to Cities Service Company
No Drawing. Filed Dec. 30, 1968, Ser. No. 788,041
Int. Cl. C07c *17/02, 23/02*
U.S. Cl. 260—648 R                    9 Claims

ABSTRACT OF THE DISCLOSURE

Processes are described for the reaction of multi-unsaturated aliphatic or cycloaliphatic hydrocarbons with elemental halogen to produce predominantly halohydrocarbon addition products. Increased yields of such fully halogenated addition products are obtained by conducting the halogenation in the presence of a halohydrocarbyl ether or ester solvent and up to about 10 moles per mole of said ether or ester of a liquid halogen free polar organic solvent. Working examples show the preparation of high purity bromoalkanes; e.g. tetra bromocyclooctane from cyclooctadiene and hexabromocyclododecane from cyclododecatriene. These high bromine content saturated products are useful as flame retardants for thermo plastic polymers.

BACKGROUND OF THE INVENTION

Field of the invention

This invention relates to improved processes for the production of halohydrocarbons by the addition of elemental halogen to multi-unsaturated aliphatic or cycloaliphatic hydrocarbons. More specifically, this invention relates to such halogenation processes which are conducted in the presence of a halohydrocarbyl ester or ether and up to about 10 moles per mole of said ester or ether of a liquid alcohol, carboxylic acid, glycol mono ether or glycol monoester.

Description of the prior art

The production of halohydrocarbons by the addition of halogens, such as bromine, chlorine or iodine to the ethylenic double bonds of monoolefinic and multi-olefinic hydrocarbons is well known. Such prior art halogenation reactions typically involve dissolving the unsaturated hydrocarbon in a suitable saturated hydrocarbon solvent and slowly introducing elemental halogen into the solution at 0° C. or lower until a measured quantity has been added or until the evolution of hydrogen halide indicates that substitution rather than addition is the predominant reaction. Generally, few difficulties are experienced in the preparation of halides from monoolefins; however, the yields of saturated and unsaturated halohydrocarbon addition products of multi-olefinic hydrocarbons are often low, with substantial quantities of the reactants being converted to substitution products, hydrogen halide and other byproducts resulting from the small quantities of reactive impurities that are usually present in the reactants and solvents. Although the production of substitution products can be reduced somewhat by substituting a liquid alcohol, such as ethanol, for the saturated hydrocarbon solvent, the resulting small improvement in the yield of the desired addition product generally is accompanied by increased halogen consumption due to the reactive nature of the alcohol. These problems are particularly acute in the bromination, at ambient or moderately elevated temperatures, of cycloaliphatic hydrocarbons having from 2 to 3 ethylenic double bonds in an 8 to 12 member carbocyclic ring.

SUMMARY

It has now been discovered that the effect of the aforementioned secondary reactions can, to a significant degree, be minimized or eliminated, and that greatly improved yields of high purity halohydrocarbon addition products can be obtained in the reaction of a multi-unsaturated aliphatic or cycloaliphatic hydrocarbon with elemental halogen by conducting the reaction in the presence of a halohydrocarbyl ester or ether solvent and up to about 10 moles per mole of said ester or ether of a liquid halogen-free polar organic solvent. Such operation not only increases the hydrocarbon conversion to the desired saturated addition product, but also greatly increases the halogen utilization.

DESCRIPTION OF THE PREFERRED EMBODIMENTS

The process of the instant invention can, like the similar prior art processes, be carried out in a batch or continuous fashion simply by contacting the multi-unsaturated hydrocarbon and halogen in a well agitated solvent system and separating the insoluble halohydrocarbon addition product by any conventional means, such as filtering or centrifuging. Although any order or mode of addition of the reactants may be employed, it is usually advantageous to maintain at least a small excess of halogen in the reaction zone during the major portion of the reaction period. This may readily be accomplished in a batch reaction by the incremental or continuous addition of the pure unsaturated hydrocarbon or solvent solution thereof to a solution of the halogen. Another method of accomplishing this result, which is useful in either a batch or continuous process, is to add both the hydrocarbon or hydrocarbon solution and the halogen or halogen solution incrementally or continuously in separate streams at such rates as to provide the desired halogen excess.

The reaction is advantageously carried out at a temperature of from about 10° C. to about 50° C., and preferably at about room temperature. Reaction temperatures above 60° C. or below —10° C. are also operative; however, there are few advantages to compensate for the low reaction rates or high halogen losses which often accompany normal pressure reactions conducted at these extreme temperatures.

The pressure under which the process of this invention is conducted is not critical and its selection depends largely upon the halogen employed. Atmospheric pressure operation is generally suitable when employing any halogen; however, the use of pressures up to 10 atmospheres or higher may often be advantageous with chlorine at any reaction temperature and with bromine or iodine at reaction temperatures above their normal boiling points.

The process of the instant invention is applicable to any multi-unsaturated aliphatic or cycloaliphatic hydrocarbon having four or more carbon atoms. Exemplary of such suitable hydrocarbons are 1,3-butadiene, isoprene, 1,4-hexadiene, 1,7-octadiene, 3-methyl-1,4,6-heptatriene, 1,4,9-decatriene, poly-1,3-butadiene, polyisoprene, 1,3-cyclopentadiene, 4-vinylcyclohexene, 1,3-cyclooctadiene, 1,5-cyclooctadiene, 1,3,5,7-cyclooctatetraene, 1,6-cyclodecadiene, 1,5,9-cyclododecatriene, trimethyl-1,5,9-cyclododecatriene and 1,5,9,13-cyclohexadecatetraene. The improved results obtained by operation in accordance with this invention are particularly notable when the multi-unsaturated reactant is a cycloaliphatic hydrocarbon having from 2 to 4 ethylenic double bonds in an 8 to 16 member carbocyclic ring and are outstanding in the case of 8 to 12 member carbocyclic dienes and trienes; e.g. cyclooctadiene, cyclodecadiene or cyclododecatriene.

As indicated above, the use of a halohydrocarbyl ester or ether solvent is a critical feature of the process of this invention. A particularly effective group of such halogenated polar solvents is represented by liquid esters and ethers of the formula $X_aRZ_b$, wherein X is a halogen group, R is an aliphatic or cycloaliphatic group having at least 4 carbon atoms, Z is a group of the formula

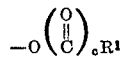

$R^1$ is an aliphatic or cycloaliphatic group, $a$ is 2 to 7, $b$ is 1 to 4, $c$ is 0 or 1 and the sum of $a$ and $b$ is 4 to 8.

The preferred group of halogenated polar solvents of this formula is that in which R is a saturated cycloaliphatic hydrocarbyl group having an 8 to 12 member carbocyclic ring, $R^1$ is a lower alkyl group, $a$ is 2 to 5, $b$ is 1 to 3 and the sum of $a$ and $b$ is 4 or 6. Exemplary of these preferred compounds are tribromocyclooctyl acetate, dibromocyclooctyl diacetate, dichlorocyclooctyl diacetate, tribromocyclooctyl propionate, triiodocyclooctyl formate, tribromocyclodecyl acetate, dibromocyclodecyl dipropionate, pentabromocyclododecyl acetate, tetrabromocyclododecyl diacetate, tribromocyclododecyl triacetate, ethoxy-tribromocyclooctane, diethoxy - dibromocyclooctane, t-butoxy-tribromocyclooctane, methoxy - trichlorocyclodecane, ethoxy-pentabromocyclododecane, diethoxy-tetrabromocyclododecane and triethoxy-tribromocyclododecane.

The quantity of halogenated polar solvent that is employed in the process of this invention may be varied over a wide range, many of the aforementioned improvements being evident at solvent levels of 3–5% or less by volume based on the multi-unsaturated hydrocarbon. Since the yield of halogenated hydrocarbon addition product is generally somewhat higher at higher solvent levels, it is preferable to use a volume of solvent which is at least as great as the volume of unreacted multi-unsaturated hydrocarbon that is present in the reaction zone.

Although the advantages of this invention can be realized when a halohydrocarbyl ester or ether is employed as the sole reaction solvent, it is often desirable to also employ a halogen-free polar organic solvent for reasons of economy and in order to insure a desirably mobile reaction mixture. When such halogen free polar organic solvent is employed, it is essential that it be present in a quantity of no more than about 10 moles, preferably from about 1 to about 9 moles, per mole of the halohydrocarbyl ester or ether solvent.

Exemplary of the halogen-free organic polar solvents of this invention are the normally liquid alcohols, carboxylic acids and glycol and polyglycol mono ethers and mono esters. Outstanding results can be obtained by the use of a preferred group of such solvents represented by the normally liquid lower alkanols, alkanoic acids and alkoxy alkanols, such as methanol, ethanol, propanol, 2-methylpropanol-2, butanol, butanol-2, 2-methylbutanol-2, formic acid, acetic acid, propionic acid, ethylene-glycol monoethyl ether and ethylene glycol monoformate. An especially preferred group of these compounds is represented by the formula HZ, where Z has the meaning as set forth above in the discussion of the halohydrocarbyl ester or ether solvents.

A particularly preferred embodiment of this invention involves the use of both a halogenated polar solvent of the formula $X_aRZ_b$ and a halogen free polar solvent of the formula HZ, wherein both solvents have the same Z group, X corresponds to the elemental halogen employed and the arrangement of carbon atoms in R corresponds to that of the multi-unsaturated hydrocarbon reactant. This can readily be accomplished by employing as the reaction medium a mixture of unreacted solvent and liquid product of the formula $X_aRZ_b$ which is produced by the interaction under conventional conditions of the multi-unsaturated hydrocarbon, the halogen and the halogen-free polar solvent of the formula HZ. An outstanding reaction medium is provided by removing the insoluble halo hydrocarbon addition products from such reaction mixture and, if necessary, by adjusting the mole ratio of unreacted halogen-free polar solvent to halogenated hydrocarbyl ether or ester product to less than 10 by adding additional halogenated solvent or by evaporating a portion of the unreacted halogen-free polar solvent. For example, at the completion of the reaction of cyclooctadiene with a small excess of bromine in ethanol, the reaction mixture is found to comprise largely tetrabromocyclooctane, ethoxytribromocyclooctane and diethoxydibromocyclooctane, as well as unreacted bromine and ethanol. Upon removal of the insoluble tetrabromocyclooctane and, when necessary, removal of excess ethanol, the remaining liquid reaction mixture is found to be an excellent solvent for subsequent cyclooctadiene brominations, as shown in the working examples below.

EXAMPLE 1

A clean three neck glass flask containing a stirrer, a dropping funnel and a thermometer is charged with 220 grams of absolute ethyl alcohol and 54 grams of 1,5-cyclooctadiene. The flask is then cooled to maintain a temperature of from 20° to 25° C. during the dropwise addition of 160 grams of dry bromine at a uniform rate over a period of 20 minutes. After bromine addition is complete the mixture is stirred for an additional three hours and insoluble products are then removed by filtration. The filtrate, which is found to be primarily a mixture of ethyl alcohol and ethoxy-bromocyclooctanes that is essentially free of unreacted 1,5-cyclooctadiene, is set aside for subsequent use in Example 2. The filter cake is washed successively with large volumes of 95% ethyl alcohol, dilute aqueous sodium bisulfite solution and water and then dried at 110° C. for one hour. Analysis of the dry white crystalline product shows that the yield of 1,2,5,6-tetrabromocyclooctane is 55.9% based on the hydrocarbon charge.

EXAMPLE 2

The non-aqueous filtrate obtained in Example 1 by separation of the precipitated insoluble product is returned to the three neck reaction flask along with 54 grams of fresh 1,5-cyclooctadiene. The dropwise addition of 160 grams of dry bromine is then begun and thereafter the reaction and product work-up is conducted as in Example 1. The yield of 1,2,5,6-tetrabromocyclooctane is 79.8% based on the fresh hydrocarbon charge.

EXAMPLE 3

The procedure of Example 1 is repeated employing 220 grams of glacial acetic acid in place of absolute ethyl alcohol. The yield of 1,2,5,6-tetrabromocyclooctane is 66% based on the hydrocarbon charge.

EXAMPLE 4

Example 3 is repeated employing, in place of the glacial acetic acid, the non-aqueous acid filtrate obtained in Example 3 by separation of the insoluble products from the reaction mixture. This filtrate is essentially free of unreacted hydrocarbon. The yield of 1,2,5,6-tetrabromocyclooctane is 84% based on the fresh 1,5-cyclooctadiene charge.

EXAMPLE 5

A clean dry 5 liter flask equipped with a stirrer is charged with 1,500 grams of absolute ethanol and 1,340 grams of dry bromine. A 432 gram charge of 1,5-cyclooctadiene is then added at room temperature over a two hour period. The reaction mixture is stirred for an additional hour, allowed to settle and the precipitated crude tetrabromocyclooctane removed by filtration. The crude is then washed successively with large volumes of 95% ethyl alcohol, dilute aqueous sodium bisulfite and water and dried at 110° C. for one hour. The yield of high purity 1,2,5,6,-tetrabromocyclooctane is 58.3% based on the hydrocarbon charge.

This entire procedure is repeated in successive runs, in each case substituting for the ethanol solvent 1,500 grams of the non-aqueous filtrate obtained by separating insoluble products from the reaction mixture of the immediate preceding run. By the third such run, the yield of 1,2,5,6-tetrabromocyclooctane is 90.3% based on the fresh hydrocarbon charge. The similarly calculated yield in each of 9 succeeding runs is well over 90%.

EXAMPLE 6

The procedure of the preceding example is repeated employing 432 grams of 1,5,9-cyclododecatriene in place of cyclooctadiene in each run. Similar improvements in the yield of 1,2,5,6,9,10-hexabromocyclododecane are noted in successive runs.

While the above examples illustrate certain preferred embodiments of this invention, we do not desire or intend to limit ourselves solely thereto, for the precise proportions of the materials utilized and the reaction conditions may be varied and equivalent chemical materials may be employed without departing from the spirit and scope of the invention as defined in the appended claims.

We claim:

1. In a process for reacting elemental bromine with a multi-unsaturated cycloaliphatic hydrocarbon having only from 2 to 3 ethylenic double bonds in an 8 to 12 member carbocyclic ring to produce a saturated bromohydrocarbon addition product, the improvement which comprises conducting said reaction in the presence of a bromocycloalkyl ester or ether solvent of the formula $Br_aRO(CO)_cR'$, wherein R is a cycloalkyl group having an 8 to 12 member carbocyclic ring, R' is a lower alkyl group, $a$ is 3 or 5 and $c$ is 0 to 1, and up to about 10 moles per mole of said ether or ester of a halogen-free polar solvent selected from the group consisting of liquid alkanols, alkanoic acids, ethylene glycol monoethyl ether, and ethylene glycol monoformate.

2. The process of claim 1 wherein the mole ratio of said halogen free polar solvent to halogenated solvent is from about 1 to about 9.

3. The process of claim 1 wherein said halogen-free solvent is a lower alkanol or alkanoic acid.

4. The process of claim 1 in which said multi-unsaturated hydrocarbon is reacted with a stoichiometric excess of bromine.

5. The process of claim 1 wherein cyclooctadiene is brominated in the presence of a lower alkoxy-bromocyclooctane and up to about 10 moles per mole of said alkoxy-bromocyclooctane of a lower alkanol.

6. The process of claim 1 wherein cyclooctadiene is brominated in the presence of a bromocyclooctyl ester of a lower alkanoic acid and up to about 10 moles per mole of said ester of a lower alkanoic acid.

7. The process of claim 1 wherein cyclododecatriene is brominated in the presence of a lower alkoxy-bromocyclododecane and up to about 10 moles per mole of said alkoxybromocyclododecane of a lower alkanol.

8. The process of claim 1 wherein cyclododecatriene is brominated in the presence of a bromocyclododecyl ester of a lower alkanoic acid and up to about 10 moles per mole of said ester of a lower alkanoic acid.

9. The process of claim 1 wherein said brominated solvent is a product of the reaction of bromine and said halogen-free solvent with said multi-unsaturated hydrocarbon.

References Cited

UNITED STATES PATENTS

| 2,471,989 | 2/1961 | Lapporte et al. | 260—660 |
| 3,271,466 | 9/1966 | Peer | 260—660 |

FOREIGN PATENTS

| 1,050,944 | 12/1966 | Great Britain | 260—648 R |
| 1,533,576 | 6/1968 | France | 260—648 R |
| 1,553,397 | 12/1968 | France | 260—648 R |
| 1,261,503 | 2/1968 | Germany | 260—648 R |

DANIEL D. HORWITZ, Primary Examiner

U.S. Cl. X.R.

260—660, 488 B